Jan. 8, 1946.  F. S. SAUNDERS  2,392,702
WEIGHING MACHINE
Filed Feb. 19, 1944   2 Sheets-Sheet 1
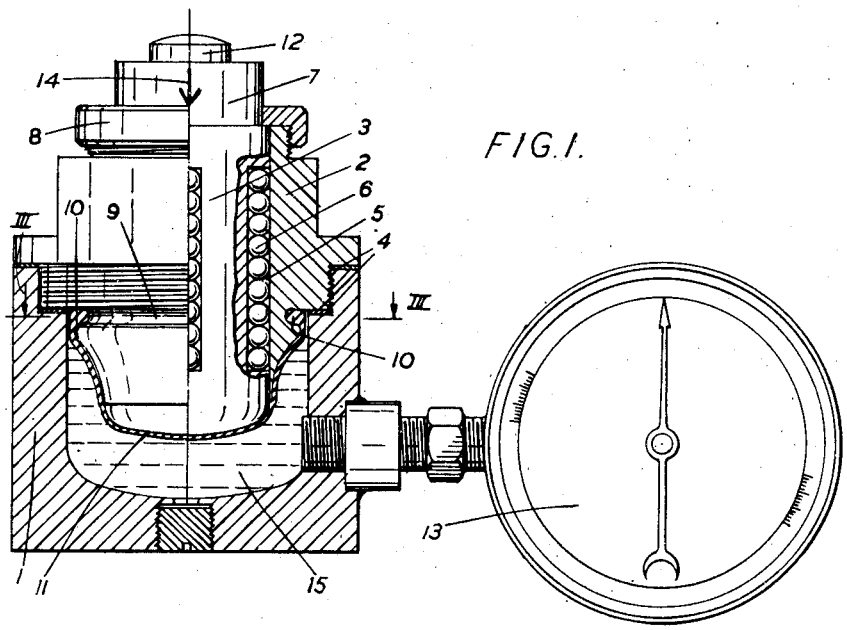
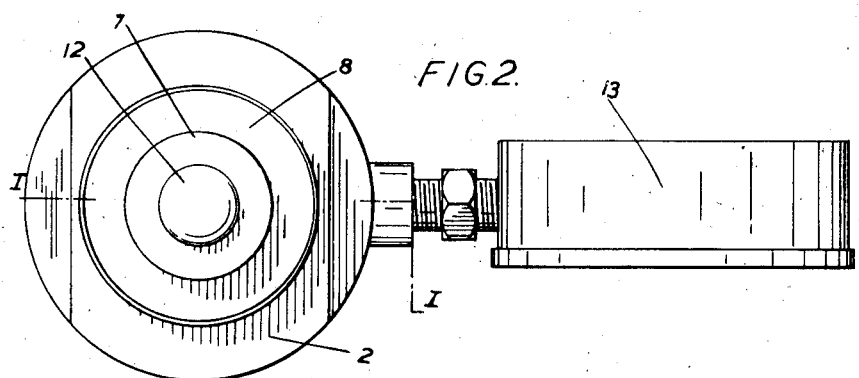
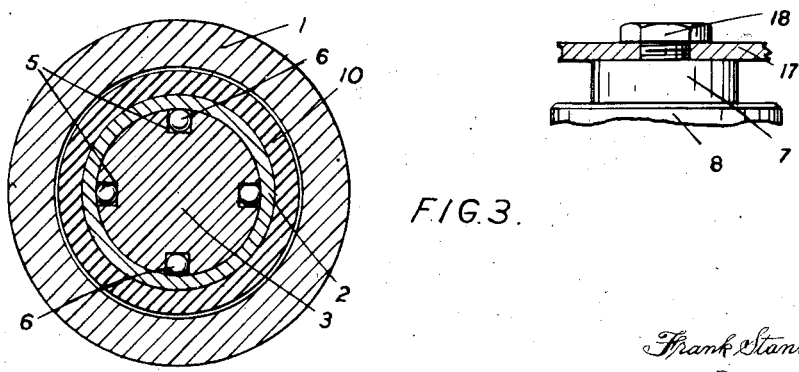
Inventor
Frank Stanley Saunders.
By
A. Knight Croad
Attorney Jan. 8, 1946.  F. S. SAUNDERS  2,392,702
WEIGHING MACHINE
Filed Feb. 19, 1944  2 Sheets-Sheet 2
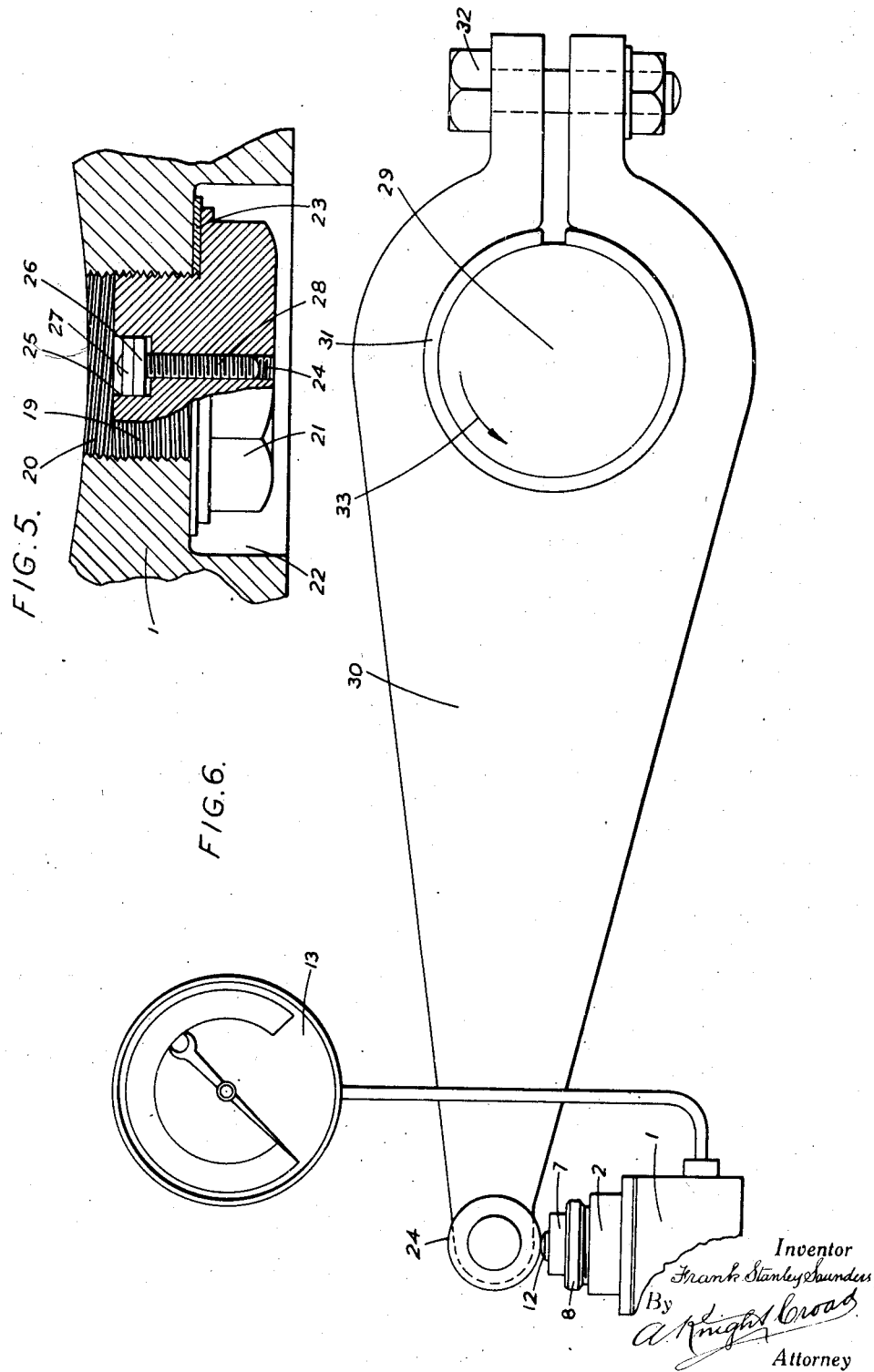

Patented Jan. 8, 1946

2,392,702

UNITED STATES PATENT OFFICE 2,392,702

WEIGHING MACHINE

Frank Stanley Saunders, Cardiff, South Wales

Application February 19, 1944, Serial No. 523,038
In Great Britain February 16, 1943

5 Claims. (Cl. 265—47)

This invention relates to weighing machines and it has for its object the provision of a machine which is simple in construction, compact in form and in which all complicated mechanism has been eliminated.

According to this invention the machine comprises a receptacle adapted to contain an incompressible fluid and fitted with a pressure gauge provided with a Bourdon tube, a cover for said receptacle, a plunger member having a limited sliding movement in said cover, and a flexible diaphragm enclosing the inner end of the plunger member, said diaphragm being supported by means on the outer face of the inner end of the cover.

In the accompanying drawings which illustrate an embodiment of this invention

Figure 1 is an elevation partly in section on line I—I of Figure 2;

Figure 2 is a plan thereof:

Figure 3 is a section on line III—III of Figure 1;

Figure 4 is a detail view in elevation of a modification;

Figure 5 is a fragmentary view, drawn to an enlarged scale of a further modification, and, Figure 6 is a diagrammatic view illustrating an application of the machine.

In the embodiment illustrated in the drawings the machine comprises a receptacle 1 of circular form, a cover 2, adapted to be secured to the top of the receptacle 1, constituting a guide for a plunger member or ram 3. The receptacle 1 and cover 2 are each provided with two seatings with interposed packings 4 so that when the cover 2 is screwed into the container a perfect liquid tight joint is obtained. The ram 3 is furnished with a plurality of vertically disposed recesses 5 adapted to contain a plurality of balls 6. The upper end of the ram 3 is reduced in diameter as at 7 and said ram is retained in position by a bush nut 8 screwed to the top of the cover or ram-guide 2 which adjacent its lower end is provided with a circumferential groove 9, and beyond said groove is tapered so that the extreme end merges into the wall of ram as shown. The groove 9 is adapted to receive the beaded edge 10 formed on an elastic diaphragm 11 of rubber or other suitable material shaped to cover and enclose the lower end of the ram 3 and ram-guide 2, the beaded edge 10 being retained in position in the groove 9 by its own elasticity. The extreme upper and outer end of the ram which takes the weight or force to be measured is provided with a knob 12 to assist in centralising the machine relatively to, for example, the jacking points provided on aircraft.

The receptacle is provided with a suitable gauge 13 of the Bourdon type, the tube of which is provided with a bleed screw for the purpose of ensuring that all air is entirely removed from the system.

The exposed upper part 7 of the ram is provided with a suitable mark, such as the arrow 14, to indicate the correct position of the ram 3 in the guide.

Assuming the machine has been assembled, to prepare same for use it is essential that all air should be entirely removed from the system and to this end the machine is turned upside down, the plug 16 is removed and the space 15 filled with oil slowly ensuring that the air within the space can escape. When this has been completed the bleed screw at the end of the gauge tube is slackened so as to permit liquid to flow therethrough, the bleed screw is then tightened and the machine topped up level with the base and the screw sealing plug 16 inserted and screwed into position. This action sets up a pressure in the machine and the gauge will indicate the same on the dial, this is corrected by unscrewing the bleed screw thereby allowing the excess of liquid to pass away and with it any small quantity of air that may have been trapped in the tube. When the needle of the gauge has returned to zero point the bleed screw is screwed up and the machine may now be inverted and is ready for use.

To allow for expansion and contraction of the fluid in the space 15 and gauge tube, said gauge may be provided with an adjustable zero point that is, the dial may be adjusted relatively to the needle.

When a weight is placed on or a force applied to the exposed upper end 7 of the ram 3 it will be transmitted by said ram to the liquid in the space 15. The pressure per square inch created in the liquid will be equal to the force divided by the area in square inches of the diameter of the ram, which pressure can be read directly on the gauge 13. The gauge 13 can of course if desired be calibrated to show directly the force applied on the knob 12 in pounds.

The device above described has the advantage that it is leak-proof in that the force applied seats the elastic diaphragm firmly against the ram and ram-guide making leakage impossible, thus overcoming the chief drawback in existing devices of a similar kind. The elastic nature of the diaphragm 11 permits a slight displacement of the ram as the diaphragm is compressed when it transmits the force to the non-compressible liquid.

According to a modification illustrated in Figure 4 the machine may be made suitable for weighing, say a single person, by securing to the upper end of the reduced part 7 of the ram 3, a plate 17 of any desired shape and size adapted to be secured to the ram by a set screw 18.

According to an alternative arrangement the body 1 of the machine may be provided with means by which the expansion and contraction of the fluid may be compensated and, one method of effecting this is by the provision of a screw plunger as illustrated in Figure 5 according to which the small sealing plug 16 as shown in Figure 1, is replaced by a plug having a screw threaded portion 19 adapted to be screwed into the screw threaded bore 20 in the body 1 and an enlarged head or nut portion 21 adapted to seat in a recess 22, a washer 23 being interposed between the contacting faces of the nut and body. The plug is provided with a screw threaded bore 24, and, at its inner end with a recess 25 adapted to receive a plunger 26 having a composition hydraulic washer 27 secured to one face thereof and a screw threaded plug 28 on the opposite face working in the threaded bore 24. When it is desired to set the gauge to zero-setting, the plug 28 is unscrewed to reduce the pressure and screwed in to increase the pressure.

When the machine prepared as above described is employed for use in weighing aircraft, a machine is interposed between the top of each jack employed and the jacking points of the aircraft.

Apart from its use for weighing various articles such as aircraft, the machine may be used for determining the torque load of engines and motors in pounds feet and one method of effecting this is diagrammatically illustrated in Figure 6 in which 1 is as before the body of the weighing machine, 7 the upper end of the plunger member or ram and 13 the torque recording gauge, 29 is the shaft of the machine under test and 30 is the brake arm one end of which is arranged to bear on the upper end 12 of the plunger 7, the other end of the brake arm 30 is mounted on the shaft 29, a friction lining 31 being interposed between the shaft and the arm, the degree of pressure between the two parts being regulated by the friction pin clamp bolt 32.

When the shaft 29 is rotating in the direction of the arrow 33 the free end of the arm 20 which is provided with a roller 24 presses on the plunger of the weighing machine 1 and the gauge will indicate a definite poundage, measuring work done. As the clamp bolt 32 is screwed up the indicated poundage will increase and adjustment is continued until the desired poundage is reached, for example, if the motor or engine driving the shaft 29 is designed to revolve at 11 R. P. M., the bolt 32 will be tightened until the weighing machine causes the gauge 13 to indicate 1,200 foot pounds.

What I claim is:

1. A hydrostatic weighing machine comprising in combination, a cup-shaped receptacle, a cover member constituting a ram-guide secured in the upper part of said receptacle, an extension on the lower end of said cover member projecting downwardly into the cup-shaped receptacle, a circumferential groove in the upper part of said extension located within the cup-shaped receptacle, a ram element having a limited sliding movement in said ram-guide, a flexible diaphragm arranged to cover the inner ends of the ram-guide and ram, a beaded edge on said diaphragm adapted to seat and be retained in said circumferential groove by its own elasticity, means for enabling an incompressible fluid to be entered into said receptacle and means for enabling pressures within the receptacle to be read externally thereto.

2. A hydrostatic weighing machine comprising in combination a cup-shaped receptacle, a cover member constituting a ram-guide secured in the upper part of said receptacle, an extension on the lower end of said cover member projecting downwardly into the cup-shaped receptacle, a circumferential groove in the upper part of said extension located within the cup-shaped receptacle, a ram-element having a limited sliding movement in said ram-guide, a plurality of vertically disposed recesses in the wall of said ram-element, a plurality of balls contained in said recesses, means for retaining said ram-element in said cover member and ram-guide, a cup-shaped flexible diaphragm arranged to cover the extension on the ram-guide and the lower end of the ram-element, a beaded edge on said diaphragm adapted to seat and be retained in said circumferential groove by its own elasticity, means for enabling an incompressible fluid to be entered into said receptacle and means for enabling pressures within the receptacle to be read externally thereto.

3. A hydrostatic weighing machine comprising in combination a container, a cover element secured in the upper part of said container, a circumferential groove adjacent the lower inner end of said cover element located within the cup-shaped receptacle, a plunger element slidably mounted in said cover element, means for limiting said sliding movement, means for supporting a weight on the upper end of said plunger element, a cup-shaped flexible diaphragm arranged to enclose the lower ends of the cover element and plunger, a headed edge on said diaphragm adapted to seat and be retained by its own elasticity in the circumferential groove in the cover element, means removable from the container for enabling said container to be filled with an incompressible fluid, and means for enabling the pressure within the container to be read externally thereto.

4. A hydrostatic weighing machine comprising a receptacle adapted to contain an incompressible fluid, a cover for said receptacle the lower end of said cover being of reduced diameter and extending into the receptacle, a plunger element having a limited sliding movement in said cover, a circumferential groove in the extension on said cover, a cup-shaped flexible diaphragm enclosing the lower inner end of the plunger element and extension on the cover, a beaded edge around the peripheral edge of said cup-shaped flexible diaphragm adapted to seat and be retained in said circumferential groove by its own elasticity, means for enabling an incompressible fluid to be entered into said receptacle, and, a pressure gauge connected to said receptacle, whereby pressures therein may be read externally thereto.

5. A hydrostatic weighing machine comprising a receptacle adapted to contain an incompressible fluid, a cover for said receptacle the lower end of said cover being of reduced diameter and depending into the fluid in said receptacle, a plunger element having a limited sliding movement in said cover, a circumferential groove in the inner reduced end of said cover, a cup-shaped flexible diaphragm enclosing the lower end of the plunger and cover, a beaded edge around the peripheral edge of said cup-shaped flexible diaphragm adapted to seat and be retained in said circumferential groove by its own elasticity, means for enabling an incompressible fluid to be entered into said receptacle, a pressure gauge connected to said receptacle whereby pressures therein may be read externally thereto and means for regulating the pressure within the receptacle for zero-setting said gauge.

FRANK STANLEY SAUNDERS.